United States Patent [19]

Okada et al.

[11] Patent Number: 4,990,203
[45] Date of Patent: Feb. 5, 1991

[54] METHOD OF WINDING REINFORCEMENT LAYER OF PNEUMATIC RADIAL TIRE

[75] Inventors: Noboru Okada, Ninomiya; Tsutomu Takeuchi, Isehara, both of Japan

[73] Assignee: The Yokohama Rubber Co., Ltd., Tokyo, Japan

[21] Appl. No.: 356,317

[22] Filed: May 24, 1989

[30] Foreign Application Priority Data

Sep. 2, 1988 [JP] Japan ................................ 63-218364

[51] Int. Cl.$^5$ .............................................. B29D 30/06
[52] U.S. Cl. ..................................... 156/117; 152/533; 156/123; 156/397
[58] Field of Search ............... 156/117, 123, 124, 130, 156/133, 397, 406.4; 152/533, 531

[56] References Cited

U.S. PATENT DOCUMENTS

| Re. 28,043 | 6/1974 | Hineline | 156/397 |
|---|---|---|---|
| 3,748,203 | 7/1973 | Greene | 156/397 |
| 3,881,974 | 5/1975 | de Zarauz | 156/123 |
| 4,049,486 | 9/1977 | Henley | 156/123 |
| 4,146,415 | 3/1979 | Caretta et al. | 156/124 |

FOREIGN PATENT DOCUMENTS 62-251203 2/1987 Japan .

*Primary Examiner*—Joye L. Woodard
*Attorney, Agent, or Firm*—Armstrong, Nikaido, Marmelstein, Kubovcik, & Murray

[57] ABSTRACT

A method of winding a reinforcement layer of a pneumatic radial tire, which comprises providing at circumferentially spaced locations opposite to a front face of an outer peripheral surface of a building drum, a pair of traverse devices each having a fiber cord feed guide and constructed so as to be reciprocated along the axial direction of the building drum; and moving the pair of traverse devices by independent driving devices along the axial direction of the building drum while rotating the building drum, thereby simultaneously feeding rubberized fiber cords respectively from each feed device to a reinforcement belt on the building drum.

4 Claims, 4 Drawing Sheets

METHOD OF WINDING REINFORCEMENT LAYER OF PNEUMATIC RADIAL TIRE

BACKGROUND OF THE INVENTION

The present invention relates to a method of winding a reinforcement layer comprising a fiber cord composed of at least one textile cord on a reinforcement belt wound round a building drum in the production process of a pneumatic radial tire, and more particularly to a method of efficiently forming a reinforcement layer free from a spliced part through continuous winding of a fiber cord round a reinforcement belt provided on a building drum.

In some pneumatic radial tires for a passenger car, a reinforcement layer having a cord angle of substantially 0° relative to the circumferential direction of the tire is wound round at least both edges of at least two reinforcement belts provided on a tread for the purpose of improving high speed durability. FIGS. 6 and 7 are each an example of the tread of a high-performance tire having high speed durability. In FIG. 6, two reinforcement belts B each comprising steel cords are provided on a carcass C of a tread T so that the cord angles cross each other, and both edges of the reinforcement belts B are covered with a reinforcement layer L comprising fiber cords having a cord angle of substantially 0° relative to the circumferential direction of the tire.

When the above-described radial tire travels at a high speed, both edges of the reinforcement belt B are forced up towards the outside in the radial direction by centrifugal force, which causes unfavorable separation. However, the above-described reinforcement layer L serves to inhibit the edges of the reinforcement belt B from being forced up to prevent the occurrence of the separation, which contributes to an improvement in the high speed durability. In order to improve the high speed durability, sometimes the reinforcement layer L is provided so as to cover not only both edges of the reinforcement belt B but also the full width of the reinforcement belt B as shown in FIG. 7.

In the production process of a tire, the winding of the reinforcement layer L round the above-described belt B is conducted on a building drum. As with the reinforcement belt B, the winding of the reinforcement layer L is generally conducted by splicing both ends of a ribbon belt formed by doubling a plurality of fiber cords in parallel. Since the fiber cords of the reinforcement layer are provided in the circumferential direction of the tire, Japanese Patent Laid-Open No. 251203/1987 proposes formation of a reinforcement layer through continuous winding of a single fiber cord coated with rubber in a spiral form in the circumferential direction of the tire without splicing the ribbon belt.

This method of winding a reinforcement layer is excellent in an improvement in the uniformity of a tire because no spliced part is formed. However, in this method, a single fiber cord coated with rubber should be continuously wound several hundred times on a building drum. This takes a very long period of time until the reinforcement layer is formed, which brings about a problem with efficiency. Further, when a reinforcement layer is formed separately on each of the left and right edges of the belt the fiber cord must be cut after winding of one reinforcement layer is completed, and the fiber cord end should be then switched for formation of another reinforcement layer. This takes not only a long time but also much labor.

SUMMARY OF THE INVENTION

An object of the present invention is to provide a method of winding a reinforcement layer of a pneumatic radial tire which comprises continuously winding a fiber cord on a reinforcement belt wound round a building drum to form a reinforcement layer free from a spliced part.

Another object of the present invention is to provide a method of winding a reinforcement layer of a pneumatic radial tire which enables efficient winding in a short time when a reinforcement layer free from a spliced part is formed by continuously winding a fiber cord on a reinforcement belt wound round a building drum.

In order to attain the above-described objects in the present invention, a pair of traverse devices each having a fiber cord feed guide and constructed so as to be reciprocated along the axial direction of a building drum are provided as a winding device opposite to the front face of the outer peripheral surface of the building drum. In the above-described structure, said pair of traverse devices are moved along the axial direction of the building drum while rotating the building drum, thereby feeding a rubberized fiber cord composed of at least one textile cord from each feed guide, and thereafter the fed fiber cords are spirally wound along substantially the circumferential direction on at least two reinforcement belts wound on the building drum to form at least one reinforcement layer comprising the fiber cords.

A desired reinforcement layer can be wound in a short time on the reinforcement belts by providing a pair of traverse devices in front of the outer peripheral surface of the building drum and simultaneously feeding rubberized fiber cords from the feed guide of each of the traverse devices. As opposed to the prior art method, a reinforcement layer can be formed separately on each of the left and right edges of the belt simultaneously without the necessity of suspending the feed of the fiber cords.

DETAILED DESCRIPTION OF THE PREFERRED EMBODIMENTS

Figure 1:
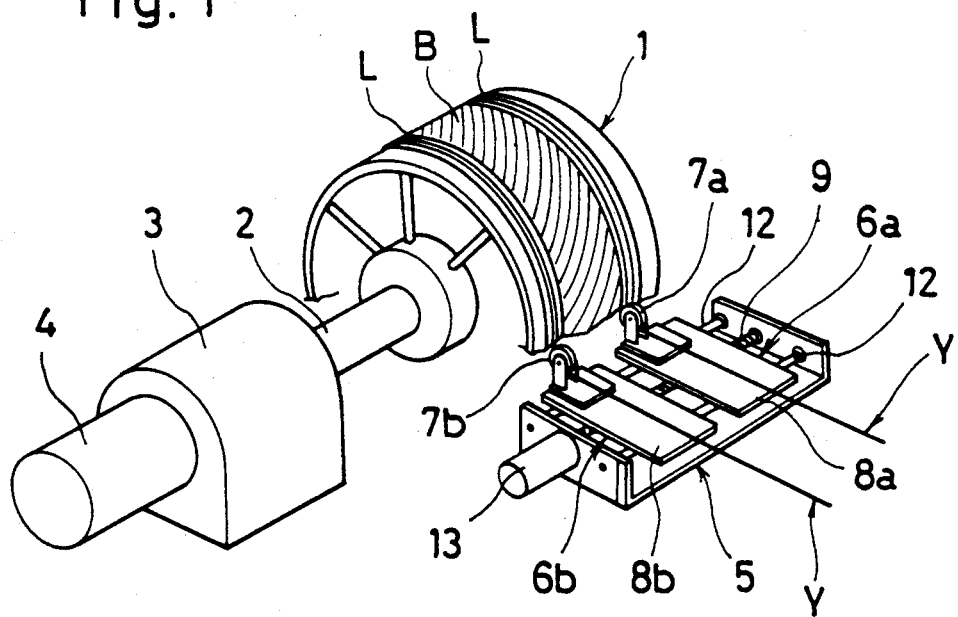
FIG. 1 is a schematic perspective view of an apparatus for practicing the method of winding a reinforcement layer according to the present invention.
Figure 2:
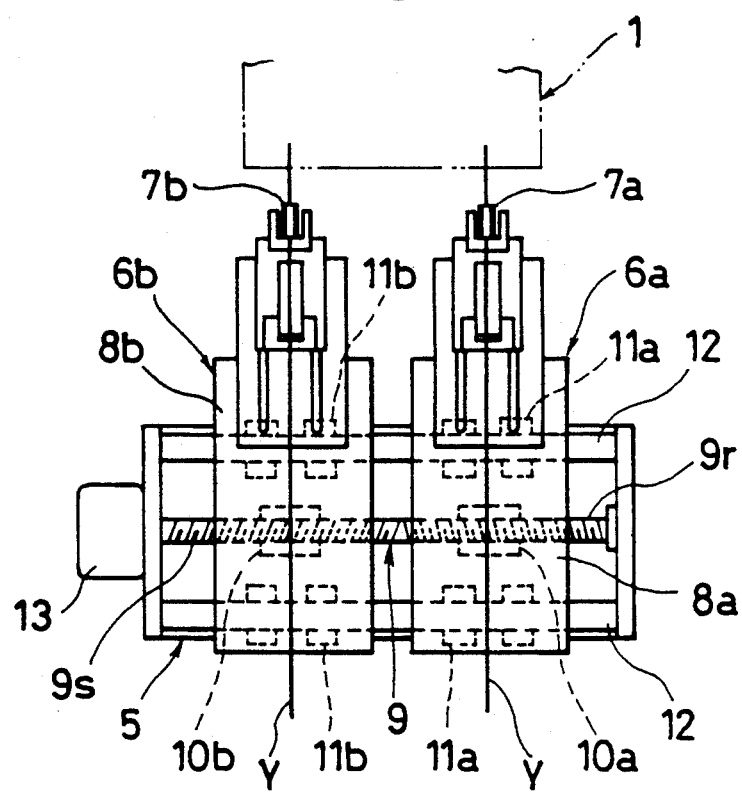
FIG. 2 is a plan view of a principal part of the apparatus shown in FIG. 1.

In the winding apparatus shown in FIGS. 1 and 2, numeral 1 designates a building drum for building a reinforcement belt B and a reinforcement layer L. The reinforcement belt B comprises at least two layers crossing each other in the direction of the cords, and at least one of them comprises steel cords. The reinforcement layer L comprises at least one layer provided so as to cover at least both edges of the reinforcement belt B and is formed by spirally winding a rubberized fiber cord Y in a continuous manner along substantially the circumferential direction of the building drum. The rubberized fiber cord is composed of at least one textile cord which is preferably an organic fiber cord and most preferably a nylon cord. In case the rubberized fiber cord is composed of more than two textile cords, those textile cords are formed to be flat.

The drum 1 is fixed to one end of a drum shaft 2 supported by a bearing 3 and rotated by a motor 4 mounted on the opposite side of the bearing 3. A support frame 5 is provided opposite to the front face of the outer peripheral surface of the building drum 1, and a pair of traverse devices 6a and 6b are provided on the support frame 5. Both the traverse devices 6a and 6bhave support plates 8a and 8b, respectively. The support plates 8a and 8b are provided with feed guides 7a and 7b for a fiber cord Y, respectively. The feed guides 7a and 7b each comprise a grooved roller. The fiber cords Y, Y are guided to the grooves and fed on the building drum 1.

The support frame 5 is provided with one ball screw 9 and two guide rods 12, 12. The ball screw 9 has a right-handed screw 9r in one moiety and a left-handed screw 9s in the other moiety of its length, and provided so that it can be rotated by a motor 13 in any of the forward and backward directions. One support plate 8aout of the two support plates 8a and 8b is engaged with the right-handed screw of the ball screw 9 through a nut 10a, while the other support plate 8b is engaged with the left-handed screw 9s of the ball screw 9 through a nut 10b. The support plates 8a, 8b are slidably fitted with guide rods 12, 12 through guides 11a, 11b, respectively. Therefore, the rotation of the ball screw 9 with the motor 13 enables the traverse devices 6a, 6b to be moved together with the feed guides 7a, 7b in the directions opposite to each other. The rubberized fiber cords Y, Y simultaneously fed from both the feed guides 7a, 7b for moving the fiber cords are spirally wound in a continuous manner on a reinforcement belt B provided on the building drum 1 driven by a motor 4 to form reinforcement layers L, L.

Figure 5:
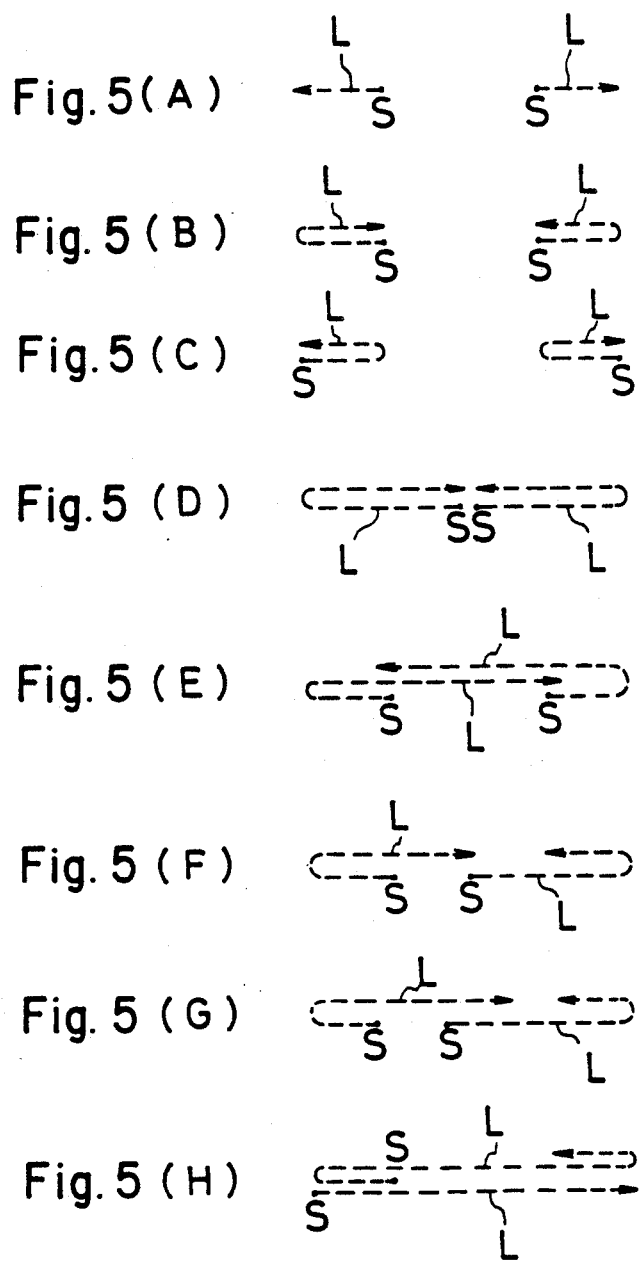
FIGS. 5(A) to (H) are cross-sectional views of examples of a reinforcement layer used in the present invention.
Figure 6:
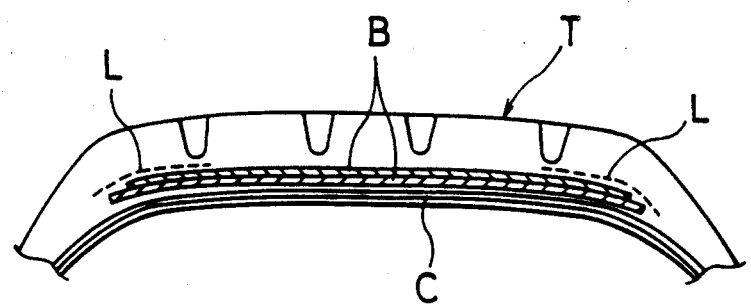
FIG. 6 is a cross-sectional view of a tread of a high-performance radial tire.
Figure 7:
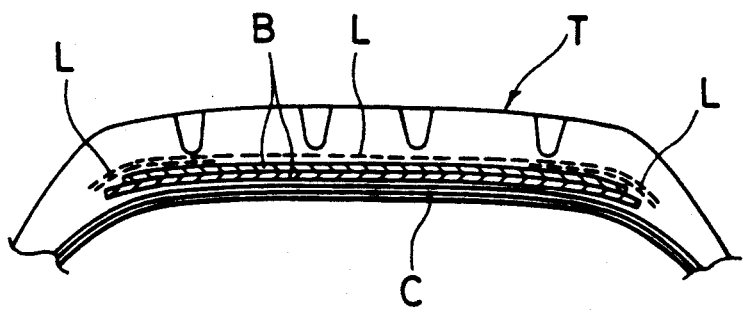
FIG. 7 is a cross-sectional view of another example of a tread of a high-performance radial tire.

When winding initiating points S, S of the two feed guides 7a, 7b are provided a little inside both edges of the reinforcement belt B and outwardly moved as shown in, for example, FIG. 5(A), reinforcement layers L, L are respectively formed on both edges of the reinforcement belt B. Further, reinforcement layers L, L overlapped to have a double layer structure as shown in FIG. 5(B) can be formed by, as shown in FIG. 5(A), moving the feed guides 7a and 7b toward both edges of the reinforcement belt and then turning back the guides toward the inside of the reinforcement belt. Further, as shown in FIG. 5(C), reinforcement layers L, L each having a double-layer structure can be formed also by placing the winding initiating points S, S of the feed guides 7a and 7b at the edges, inwardly moving both the feed guides and outwardly turning back the feed guides. As shown in FIG. 5(D), reinforcement layers L, L covering substantially the full width of the reinforcement belt can be formed by placing the winding initiating points S, S at a center, moving the feed guides respectively toward the edges and turning back the feed guides toward the center.

Thus, the left and right reinforcement layers L, L can be symmetrically and simultaneously formed on the reinforcement belt B by feeding a pair of fiber cords Y, Y on the reinforcement belt B while traversing the fiber cords in the directions opposite to each other. Further, the winding can be efficiently completed in a short time by simultaneously feeding a pair of fiber cords.

Figure 3:
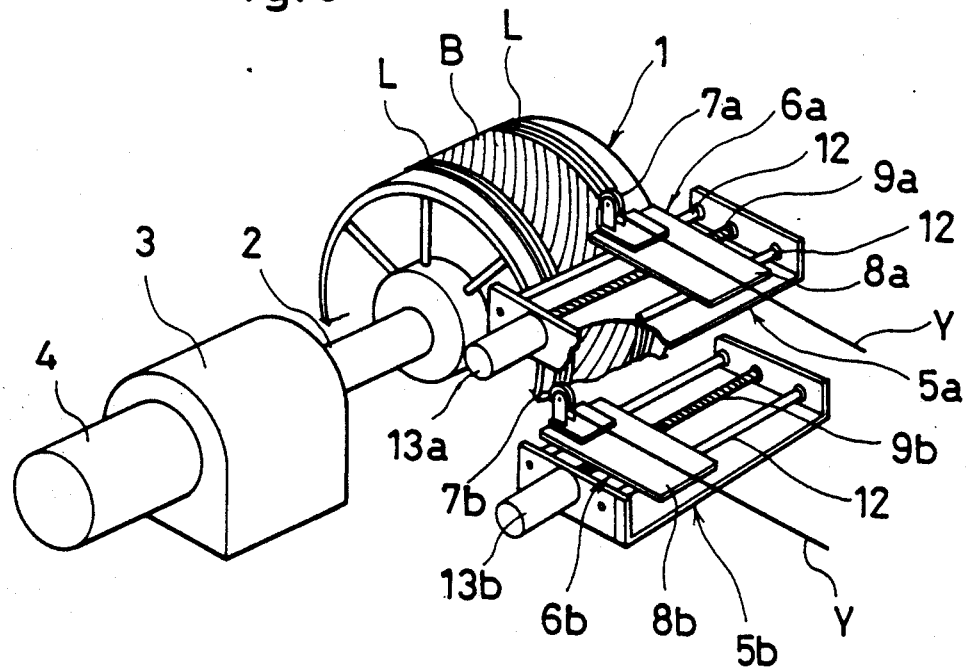
FIG. 3 is a schematic perspective view of another example of an apparatus for practicing the method of winding a reinforcement layer according to the present invention.
Figure 4:
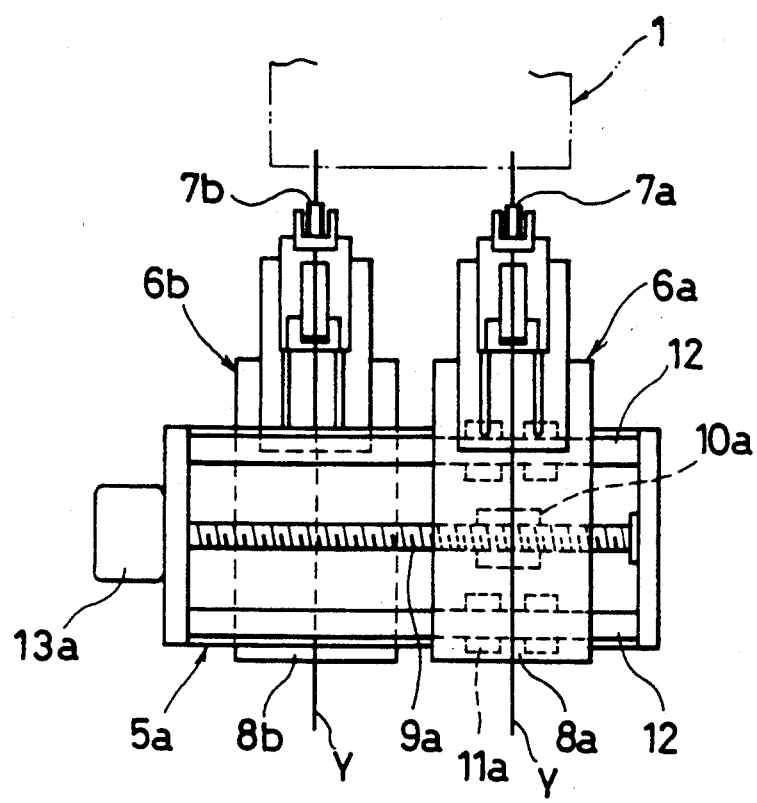
FIG. 4 is a plan view of a principal part of the apparatus shown in FIG. 3.

FIGS. 3 and 4 relate to another example of the winding device. In this device, a pair of traverse devices 6a, 6b are supported by frames 5a and 5b separately provided respectively as upper and lower frames and provided so that they are driven by separately provided ball screws 9a, 9b. The two ball screws 9a, 9b are the same with each other in the direction of the thread and driven by motors 13a, 13b, respectively. When the two motors 13a and 13b rotate in a same direction each other, the two traverse devices 6aand 6b can be moved together with the feed guides 7a, 7b along the axial direction of the building drum 1 in the same directions, while they rotate in opposite directions each other, the two traverse devices 6a, 6b can be moved in the directions opposed to each other.

In the first Example shown in FIGS. 1 and 2, since the traverse devices 6a, 6b are driven with one ball screw, they cannot traverse fiber cords overlapping each other. On the other hand, in the second Example shown in FIGS. 3 and 4, since the traverse devices 6a, 6b are separately provided respectively as upper and lower traverse devices and driven by separate ball screws 9a, 9b, they can traverse fiber cord overlapped with each other. For this reason, in the first Example, as shown in FIGS. 5(A) to (D), only reinforcement layers L, L not overlapping each other can be formed, while in the second Example, it is possible to form not only the reinforcement layers L, L not overlapping each other as shown in FIGS. 5(A) to 9D but also various reinforcement layers L, L overlapping each other shown in FIGS. 5(E) to (H).

As described above, according to the present invention, two fiber cords are simultaneously fed to form a reinforcement layer, which enables the winding to be efficiently conducted in a short time as opposed to the prior art method wherein the reinforcement layer is formed with only one fiber cord. Further, also in the case of the formation of the reinforcement layers separately in both the left and right edges, as opposed to the prior art method, there is no necessity of replacing the fiber cord, which contributes to an improvement in the workability.

What is claimed is:

1. A method of winding a reinforcement layer of a pneumatic radial tire; which includes winding at least two reinforcement belts on a building drum and spirally winding a rubberized fiber cord composed of at least one textile cord in a continuous manner on at least both edges of said reinforcement belts along substantially the circumferential direction of said building drum to form at least one reinforcement layer comprising said rubberized fiber cord at each of said edges of said reinforcement belts, wherein the improvement comprises the steps: of providing a pair of traverse devices each having a fiber cord feed guide and constructed so as to be reciprocated along the axial direction of said building drum at circumferentially spaced locations opposite to the front face of an outer peripheral surface of said building drum; and moving each of said traverse devices along the axial direction of said building drum by independent driving means while rotating said building drum, thereby simultaneously and independently feeding fiber cords respectively from each of said feed guides to wind two reinforcement layers on said reinforcement belts.

2. A method of winding a reinforcement layer of a pneumatic radial tire according to claim 1, wherein each of said traverse devices is individually engaged with a respective one of two ball screws provided along the axial direction of the building drum so as to be moved separately by rotation of said two ball screws.

3. A method of winding a reinforcement layer of a pneumatic radial tire according to claim 1, wherein the reinforcement layers wound through each of said traverse devices are at least partly overlapped with each other.

4. A method of winding a reinforcement layer of a pneumatic radial tire according to claim 1, wherein the textile cord is a nylon cord.

* * * * *